June 2, 1964 — C. S. REED — 3,134,988
COMPOSITE INSULATOR
Filed Jan. 29, 1962 — 2 Sheets-Sheet 1
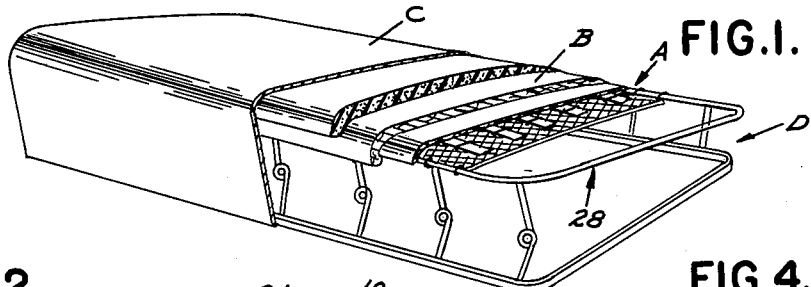
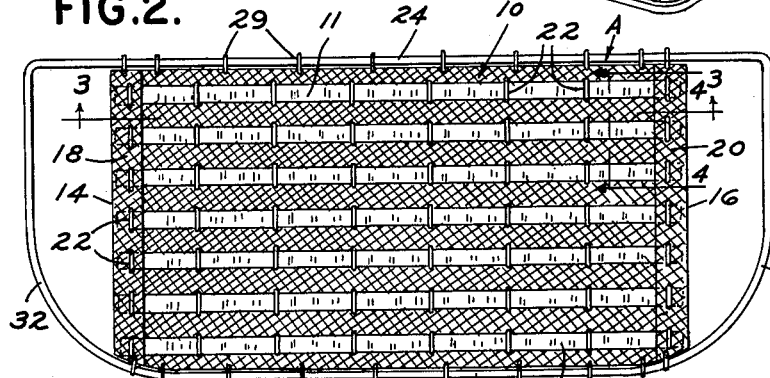
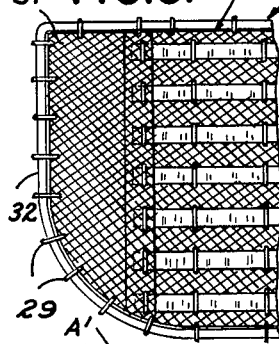
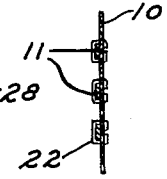
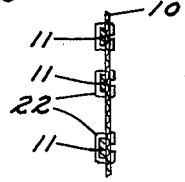
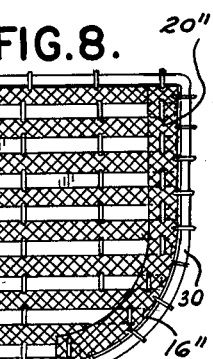
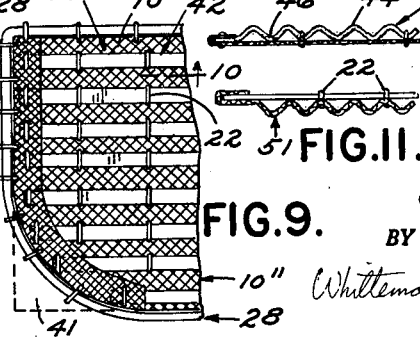
INVENTOR.
CLAIR S. REED
BY Whittemore, Hulbert & Belknap
ATTORNEYS

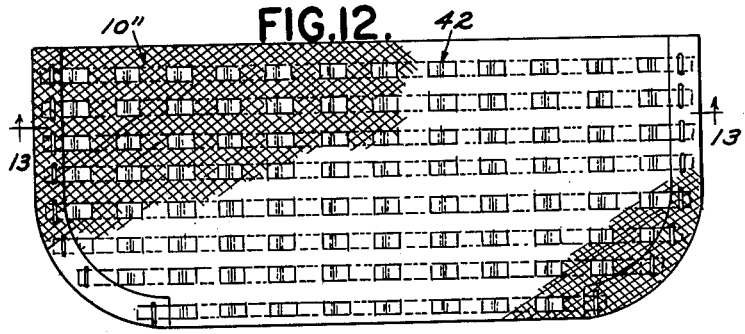
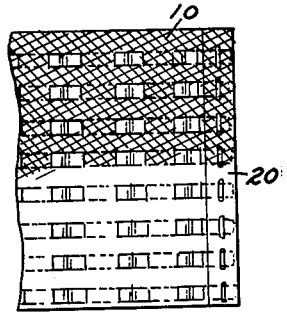
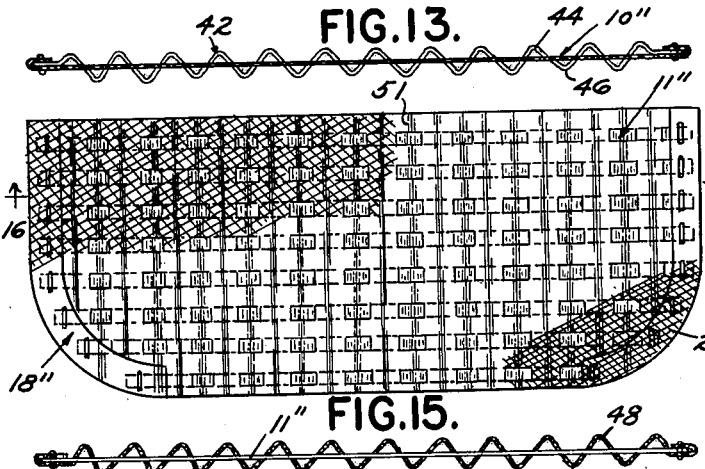
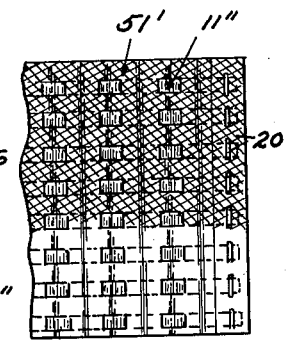
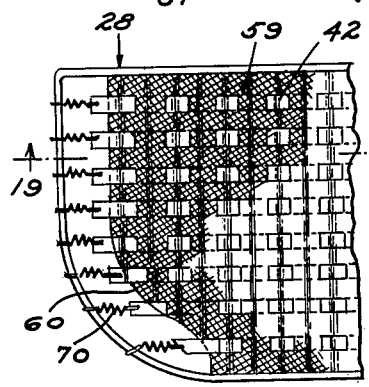
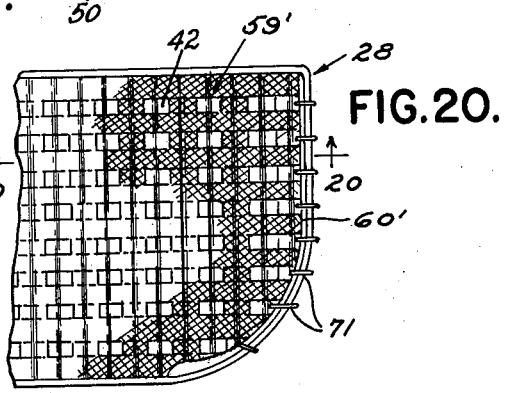
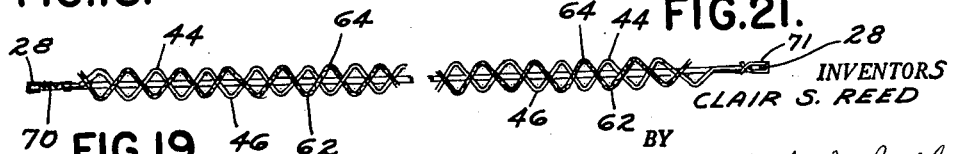

United States Patent Office 3,134,988
Patented June 2, 1964

3,134,988
COMPOSITE INSULATOR
Clair S. Reed, Wayne, Mich., assignor to Van Dresser Specialty Corporation, Warren, Mich., a corporation of Michigan
Filed Jan. 29, 1962, Ser. No. 169,469
10 Claims. (Cl. 5—354)

This invention relates generally to insulators and refers more particularly to a composite insulator for use between the padding and supporting spring structure of an upholstered assembly.

One of the essential objects of the invention is to provide an insulator comprising a horizontal sheet of flexible material, and a plurality of transversely flat, flexible, reinforcing strands for the sheet extending substantially parallel to the horizontal plane of the sheet at laterally spaced points thereof.

Another object is to provide an insulator wherein the strands are shorter than the border frame, and wherein the sheet of flexible material is provided with extensions beyond the ends of the strands that may either be separate from and secured to or integral with the sheet of flexible material, which extensions may be anchored to the adjacent portions of the border frame.

Another object is to provide an insulator comprising a sheet of flexible material, and a plurality of substantially parallel, flexible strands upon one surface of the sheet and secured to the latter at spaced points thereof.

Another object is to provide an insulator comprising an elongated sheet of flexible material, and a plurality of substantially parallel, transversely flat, flexible, resilient strands extending lengthwise of the sheet upon one surface thereof in laterally spaced relation, said strands being straight and secured to the sheet in surface-to-surface engagement therewith.

Another object is to provide an insulator wherein the sheet is flat and the strands on one surface of the sheet are of undulating form intermediate their ends to provide vertically extending portions curved toward the sheet and vertically extending portions curved away from the sheet.

Another object is to provide an insulator wherein the strands are straight and the sheet intermediate the ends thereof is of undulating form having vertically extending portions curved toward the strands and vertically extending portions curved away from the strands.

Another object is to provide an insulator comprising a sheet of flexible material, and a plurality of laterally spaced, transversely flat, flexible reinforcing strands threaded loosely through the sheet.

Another object is to provide an insulator wherein the sheet is flat and the strands threaded through the sheet have intermediate portions of undulating form, successive undulations of the strands being disposed alternately upon opposite sides of the sheet.

Another object is to provide an insulator wherein the strands threaded through the sheet are straight and the sheet intermediate the ends thereof is of undulating form so that successive undulations of the sheet are disposed alternately upon opposite sides of the strands.

Another object is to provide an insulator wherein the sheet and the strands threaded therethrough have in each instance intermediate their ends portions of undulating form, successive undulations of the strands being disposed alternately upon opposite surfaces of the sheet in vertically opposed relation to successive undulations of the sheet.

Another object is to provide an insulator having strands threaded loosely through the sheet, wherein fasteners such as hog rings are connected to the opposite ends of the strands for attachment to opposite edges of the border frame of the supporting spring structure.

Another object is to provide an insulator having strands threaded loosely through the sheet, wherein yieldable means such as spring elements are connected to opposite ends of the strands for attachment to opposite edges of the border frame of the supporting spring structure.

Other objects and features of the invention will become apparent as the description proceeds, especially when taken in conjunction with the accompanying drawings, wherein:

FIGURE 1 is a perspective view of an upholstered assembly provided with an insulator embodying my invention, and showing parts broken away and in section.

FIGURE 2 is a top plan view of the insulator shown attached to the border frame of the supporting spring structure.

FIGURE 3 is a sectional view taken on the line 3—3 of FIGURE 2.

FIGURE 4 is a sectional view taken on the line 4—4 of FIGURE 2.

FIGURE 5 is like FIGURE 4, but shows a modification.

FIGURE 6 is a fragmentary view similar to a portion of FIGURE 2 but showing another modification.

FIGURE 7 is similar to FIGURE 6 but shows another modification.

FIGURE 8 is a view similar to FIGURE 2, showing still another modification.

FIGURE 9 is a fragmentary view illustrating a modification of the insulator shown in FIGURE 8.

FIGURE 10 is a sectional view of the insulator of FIGURE 9 taken on the line 10—10 of FIG. 9.

FIGURE 11 is a view like FIGURE 10 of an insulator having a modified construction.

FIGURE 12 is a plan view of an insulator having a further modified construction.

FIGURE 13 is a sectional view taken on the line 13—13 of FIGURE 12.

FIGURE 14 is a fragmentary view showing a modification of the insulator of FIGURE 12.

FIGURE 15 is a plan view of a modified insulator.

FIGURE 16 is a sectional view taken on the line 16—16 of FIGURE 15.

FIGURE 17 is a fragmentary view of a modification of FIGURE 15.

FIGURE 18 is a fragmentary view of another modification.

FIGURE 19 is a sectional view taken on the line 19—19 of FIGURE 18.

FIGURE 20 is a fragmentary view of a modification of FIGURE 18.

FIGURE 21 is a sectional view taken on the line 21—21 of FIGURE 20.

In the drawings, A is an elongated, substantially rectangular, horizontally extending, flexible insulator embodying my invention disposed between an overlying padding B for an exterior trim material C and an underlying supporting spring structure D of an upholstered assembly.

As shown, the insulator A includes an elongated, substantially rectangular non-extensible sheet 10 of flexible material, and separate uniformly spaced, parallel, flexible, resilient, transversely flat, non-extensible reinforcing strands or bars 11 of uniform length extending lengthwise of the sheet upon one surface thereof. The bars may be of the same gauge, as shown in FIGURE 4, or they may be of different gauge and/or spacing, as explained hereinafter.

The sheet 10 is flat and the strands or bars 11 are straight and in surface-to-surface engagement with the sheet, as seen in FIGURE 3. The ends of the strands or bars terminate close to the opposite straight ends 14 and 16 of the sheet 10, and sheet 10 is provided along the opposite ends 14 and 16 with integral marginal portions 18 and 20 which are return bent or folded over the opposite ends of the strands or bars. Securing means preferably in the form of generally C-shaped staples 22 form of round or flat stock, straddle the strands or bars 11 at longitudinally spaced points thereof and are secured to the sheet 10. Such staples 22 also secure the marginal portions 18 and 20 over the ends of the strands to the sheet 10. In place of staples, stitching or any other suitable securing means may be employed.

FIGURE 2 shows the insulator A secured to the longitudinally extending sides 24 and 26 of the border frame 28 of the supporting spring structure D. Fasteners, preferably in the form of hog rings 29, are provided to secure the insulator to the sides 24 and 26. The hog rings pierce the material of the sheet and encircle the sides 24 and 26 of the border frame. The opposite ends of the insulator terminate short of the contoured ends 30 and 32 of the border frame.

Although the various elements of the insulator may be formed of any suitable material for the purposes set forth, the rectangular sheet 10 is preferably formed of burlap, and the reinforcing strands or bars 11 are preferably formed of flat metal stock.

FIGURE 5 is like FIGURE 4 but shows a modification in which the strands or bars 11 are of different gauge and different spacing. It will be understood that an insulator may have strands or bars of the same gauge and different spacing, or different gauge and the same spacing.

FIGURE 6 illustrates a modification in which the insulator A has an extension 31 at one end which fills the space between that end of the insulator and the contoured end 32 of the border frame. The extension 31, of burlap for example, may be secured to the border frame by hog rings 29 which encircle the border frame and pierce the material of the extensioin. It will be understood that the opposite end of the insulator will also have a similar extension filling the space between that end of the insulator and the end 30 of the border frame and hog ringed thereto. As shown, the extensions may be separate strips stitched or otherwise suitably secured to the ends of the insulator, or they may be integral end portions of the sheet 10. If the extensions are integral with sheet 10, then the ends of the strands or bars would not be covered with folded end portions of the sheet 10, although separate strips, similar to portions 18 and 20, might be employed to cover the ends of the strands or bars if desired.

FIGURE 7 illustrates a modification of the insulator shown in FIGURE 2 which is identified by the reference character A'. The insulator A' differs from the insulator A only in that it is longer. In other words, it is of a length equal to the maximum distance between the ends 30 and 32 of the border frame. The insulator A' is rectangular as was the insulator A. This view illustrates how the longer end of the insulator are secured to the border frame 28. As shown, a corner portion 33 of the end of the insulator, including the sheet and strands or bars is folded over the rounded portion of the end 32 of the border frame and the margins of the insulator secured by hog rings 29 to the border frame as before. The opposite end of the insulator will be secured to the corresponding end of the border frame in the same manner.

FIGURE 8 illustrates a further modification of the insulator of FIGURE 2, designated A". The insulator A" differs from the insulator A in that the ends 14" and 16" of the sheet 10" are contoured to conform with the configuration of the ends 30 and 32 of the border frame. The flexible strands or bars 11" differ from strands or bars 11 only in that they are of different lengths to conform the contour of the ends of the sheet, and the marginal portions 18" and 20" of the sheet 10" are likewise return bent and secured over the ends of the strands or bars. The entire margin of the insulator is hog ringed to the sides of the border frame and it will be understood that the insulator does not need to be stretched or folded over the sides of the border frame because it is shaped to conform to the configuration thereof about its entire periphery.

FIGURES 9 and 10 illustrate an insulator designated 40 which is the same as the insulator A" shown in FIGURE 8 except for the configuration of the strands or bars 42. The strands or bars 42, like the strands or bars in FIGURE 8, are transversely flat and formed of flexible, resilient material, but instead of being longitudinally straight they are of undulating form between the ends to provide upper curved portions 44 spaced from the flat sheet 10" and lower curved portions 46 contacting the sheet. Suitable securing means, such for example as the staples 22, secure the strands or bars to the sheet at points where certain of the vertically extending portions 46 contact the sheet. The insulator 40 may also be rectangular, as indicated by the dotted lines 41, it being understood that if rectangular the corners would be folded over the rounded ends of the border frame as in FIGURE 7.

FIGURE 11 illustrates a further modification of the FIGURE 8 construction which differs in that the sheet of flexible material, instead of being flat, is of undulating form between its ends to provide upper curved portions 48 contacting the straight strands or bars 11" and lower curved portions 50 spaced from the strands or bars. The undulations of the sheet of flexible material extend at right angles to the strands or bars. Otherwise, the sheet, designated 51, is like sheet 10" of FIGURES 9 and 10. The staples 22, or other suitable means, secure the sheet to the strands or bars at the points where certain of the vertically extending portions 48 contact the strands or bars.

FIGURES 12 and 13 show a further modification which is like FIGURES 9 and 10, but differs in that the undulations of the strands or bars 42 thread loosely through the material of the flat sheet 10". In other words, the upper curved portions 44 of the strands or bars are on one side of and spaced from the flat sheet, and the lower curved portions 46 of such strands or bars 42 are on the opposite side of and spaced from said flat sheet.

FIGURE 14 shows a modification of the insulator of FIGURES 12 and 13 which differs only in the configuration of the ends. The insulator of FIGURE 14 is rectangular and has straight ends, one of which is shown and the other of which is of the same configuration. The ends of the sheet, which is designated 10 because it is like the sheet in FIGURE 2, are folded over the ends of the strands or bars, as shown at 20, in the same manner as in FIGURES 2–6. It will be understood that the insulator of FIGURE 14 may either be substantially shorter than the border frame, as in FIGURE 2, or substantially equal in length to the border frame, as in FIGURE 7.

FIGURES 15 and 16 illustrate an insulator which is similar to the insulator in FIGURE 11. The insulator of FIGURES 15 and 16 differs, however, in that the straight strands or bars 11", instead of lying entirely upon one side of the undulating sheet 51, thread loosely through the sheet. Accordingly, the undulating portion of the insulator has lower curved portions 50 on one side of and spaced from the strands or bars, and has upper curved portions 48 on the opposite side of and spaced from said strands or bars.

FIGURE 17 shows a modification of the insulator of FIGURES 15 and 16, differing in that it is rectangular. While only one end is shown, it will be understood that the opposite end is the same. The ends of the sheet 51' are folded over the ends of the strands or bars 11", as indicated at 20.

FIGURES 18 and 19 show a further modification in which the sheet 59 of flexible material has contoured ends 60. This sheet 59 is like sheet 51 in FIGURE 15, but somewhat shorter and without marginal portions folded over the ends of the strands or bars. While only one end of the insulator is shown, the opposite end is exactly the same and bears the same relationship to the corresponding end of the border frame 28. In other words, the sheet of flexible material is shorter than the border frame 28 so that a space exists between the ends of the insulator and the ends of the border frame. The sheet is of undulating form between its ends, as was the case with the insulator in FIGURES 15 and 16, and has lower curved portions 62 and upper curved portions 64.

In FIGURES 18 and 19 the reinforcing strands or bars are like the strands or bars 42 shown in FIGURES 12 and 13, and hence bear the same reference numerals. The undulating strands or bars have upper curved portions 44 and have lower curved portions 46. The strands or bars thread loosely through the sheet, and viewed in FIGURE 19, the lower curved portions 62 of the undulations of the sheet are vertically opposed to the upper curved portions 44 of the strands or bars, and the upper curved portions 64 of the sheet are vertically opposed to the lower curved portions 46 of the strands or bars.

Extensible, yieldable means preferably in the form of spring elements 70 are secured to opposite ends of the strands or bars and encircle the ends of the border frame 28 of the supporting spring structure.

FIGURES 20 and 21 illustrate a modification of FIGURES 18 and 19. In FIGURES 20 and 21 the contoured ends 60' of the sheet 59' of flexible material terminate closer to the ends of the border frame 28. Otherwise the insulator of FIGURES 20 and 21 is like the one shown in FIGURES 18 and 19. Instead of the spring elements 70, hog rings or clips 71 extend through opposite ends of the strands or bars 42 and encircle the ends of the border frame 28 to secure the insulator thereto.

It will be understood that in each of the modifications of the invention shown, the flexible sheet and the strands may be formed of the same materials as the insulator of FIGURES 1–5. Also the strands may be of the same or different gauge, and of the same or different spacing.

What I claim as my invention is:

1. An elongated insulator for use between an elongated overlying padding and an elongated underlying supporting spring structure having an elongated border frame; comprising a substantially horizontally extending non-extensible elongated sheet of fabric, separate transversely spaced substantially parallel non-extensible metal reinforcing bars extending lengthwise of said elongated sheet and having opposite ends thereof terminating adjacent to opposite ends of said elongated sheet, said reinforcing bars having a width greater than the thickness thereof and being held against transverse displacement relative to said elongated sheet, and means for securing said elongated sheet to said border frame.

2. The insulator defined in claim 1, wherein the elongated sheet has at opposite ends thereof return bent portions extending over opposite ends of said reinforcing bars, and fasteners extend through said return bent portions, straddle said reinforcing bars, and are secured to said elongated sheet.

3. The insulator defined in claim 1, wherein fasteners straddle said reinforcing bars at longitudinally spaced points thereof and extend through and are secured to said elongated sheet to hold said reinforcing bars against transverse displacement.

4. The insulator defined in claim 1, wherein the elongated sheet is flat, and the reinforcing bars are flat and are insurface-to-surface relation with one surface of said elongated sheet.

5. The insulator defined in claim 1, wherein the elongated sheet is flat, and the reinforcing bars are undulated and are threaded through said flat sheet.

6. The insulator defined in claim 1, wherein the elongated sheet is undulated, and the reinforcing bars are straight and are threaded through the undulations of said flat sheet.

7. The insulator defined in claim 1, wherein the elongated sheet is flat, and the reinforcing bars are undulated and are anchored upon one surface of said flat sheet.

8. The insulator defined in claim 1, wherein the reinforcing bars are straight, and the elongated sheet is undulated and is anchored upon one surface of said reinforcing bars.

9. The insulator defined in claim 1, wherein the elongated sheet is undulated, the reinforcing bars are undulated and are threaded through the undulations of said elongated sheet, and extensible spring elements are connected to and extend endwise from said reinforcing bars and are adapted to be secured to the elongated border frame at opposite ends thereof.

10. In combination, an upholstery spring structure having a horizontally extending elongated border frame provided with transversely spaced longitudinally extending front and rear members and provided with longitudinally spaced transversely extending end members terminally secured to said front and rear members, a horizontally arranged elongated flexible insulator within and extending lengthwise of said border frame and including a horizontally arranged elongated undulated sheet of flexible material extending lengthwise of said border frame and having opposite ends thereof spaced from opposite end members of said border frame, separate transversely spaced substantially parallel flexible undulated metal reinforcing bars threaded through the undulations of said sheet and having opposite ends thereof terminating adjacent opposite ends of said sheet, and spring elements extending between and terminally connected to said bars and to the end members of said border frame.

References Cited in the file of this patent
UNITED STATES PATENTS

| 2,221,507 | Clark | Nov. 12, 1940 |
| 2,283,116 | Young | May 12, 1942 |
| 3,024,477 | Reed | Mar. 13, 1962 |
| 3,024,565 | Reed | Mar. 13, 1962 |

FOREIGN PATENTS

| 503,891 | Canada | June 22, 1954 |